UNITED STATES PATENT OFFICE.

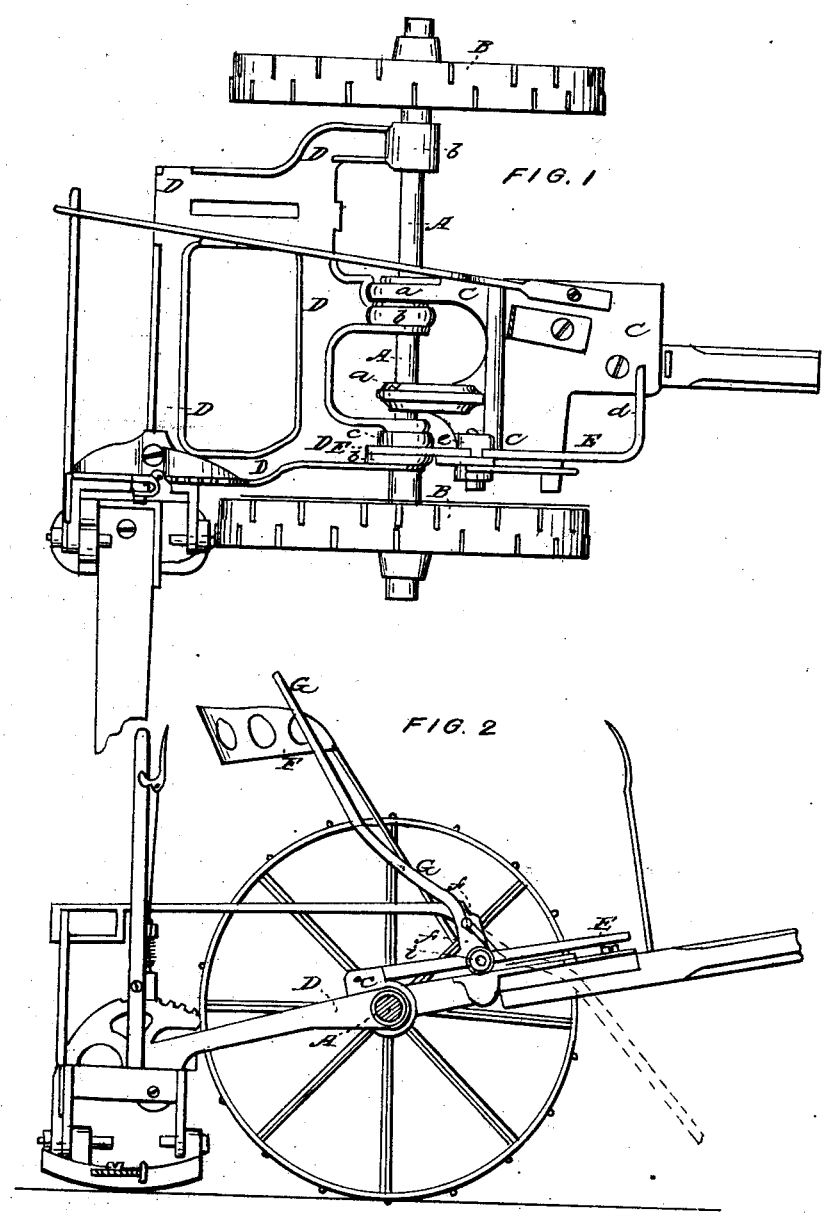

JAMES ANTHONY, OF LEDYARD, NEW YORK, ASSIGNOR TO CYRENUS WHEELER, JR., OF AUBURN, NEW YORK.

IMPROVEMENT IN HARVESTERS.

Specification forming part of Letters Patent No. 69,606, dated October 8, 1867.

*To all whom it may concern:*

Be it known that I, JAMES ANTHONY, of Ledyard, in the county of Cayuga and State of New York, have invented certain new and useful Improvements in Harvesting-Machines; and I do hereby declare the following to be a full, clear, and exact description of the same, reference being had to the accompanying drawings, making a part of this specification, in which—

Figure 1 represents a top plan of so much of a harvesting-machine as will illustrate my invention. Fig. 2 represents a side elevation, with the wheel removed to show the parts behind it.

Similar letters of reference, where they occur in the separate figures, denote like parts in both of them.

My invention relates to a system of levers in connection with two frames, both of which are hinged to the main axle, one lever on each frame, and one of the two crossing the joint between the frames, and moving near enough to the other to make one lock or brace the other, and thus stiffen the joint between the frames and lift up and carry the cutting apparatus upon the wheels, as will be explained.

A is the main axle of the machine, and supported on the two carrying-wheels B B. To the axle A is hinged a front frame, C, as at $a$ $a$, and a rear frame, D, as at $b$ $b$ $b$, both frames, under certain circumstances, being free to hinge or swing about the axle A as a common center, but capable of being made stiff or rigid, in which condition the two frames would operate as though they were a single frame hung by its central portion to said axle, as follows: To the rear frame, D, there is pivoted, as at $c$, a foot-lever, E, which projects forward from its pivot past the axle, and consequently past the joint or hinges of the two frames, and terminates in a bent end, $d$, upon which the driver in his seat F may readily place his foot.

To an upright, $e$, on the front frame, C, is pivoted a lever, G, which extends above its pivot up to the driver's seat, or to a point where the driver in his seat may readily grasp and operate it. Below the pivot this lever G has a cam-shaped foot, $f$, the extreme end of which is rounded, so as to fit over or upon a friction-wheel, $i$, upon the other or foot lever, E.

The operation of these two levers E G is as follows: The driver's seat being upon the front frame and the lever E attached to the rear frame, the driver can, by his foot upon the end of said lever E, raise up the rear frame, and let it down again by removing his foot; but when it rises hard, or if the driver desires to raise up the rear frame and the cutting apparatus attached to it, and to hold it up and so carry it, he can materially aid himself by the hand-lever G, which bears upon the foot-lever, and thus makes a system or compound lever of the two; and when the rounded foot $f$ of the hand-lever comes fairly upon the perimeter of the friction-roller $i$, it will lock said rear frame and its appendages in their raised-up position and render the two frames rigid, or as one frame, by the so locking of the lever that crosses their hinged line.

There are other parts and portions of a harvesting-machine shown in the drawings; but as my invention relates to the two levers in connection with the two frames, it is not necessary here to further describe the parts so shown.

I have described the two frames as hinged to the axle. They are so, so far as the axle as a common center of vibration of both is concerned; but the front frame is really hinged to the lugs of the rear frame, through which lugs, sleeves, or bosses the main axle passes, so that the rear frame is drawn by the front frame, while both can turn or vibrate around the axle as a center, or a shaft or other hinged connection near to said main axle.

Having thus fully described my invention, what I claim is—

In combination with a frame in two parts, and hinged to the main axle as a common center, the two levers E G, one on each frame, and operating conjointly to raise or hold in a raised position the rear frame and cutting apparatus connected to it, substantially as described.

JAMES ANTHONY.

Witnesses:
ALLEN MOSHER,
J. S. MARTIN.